Patented Nov. 4, 1952

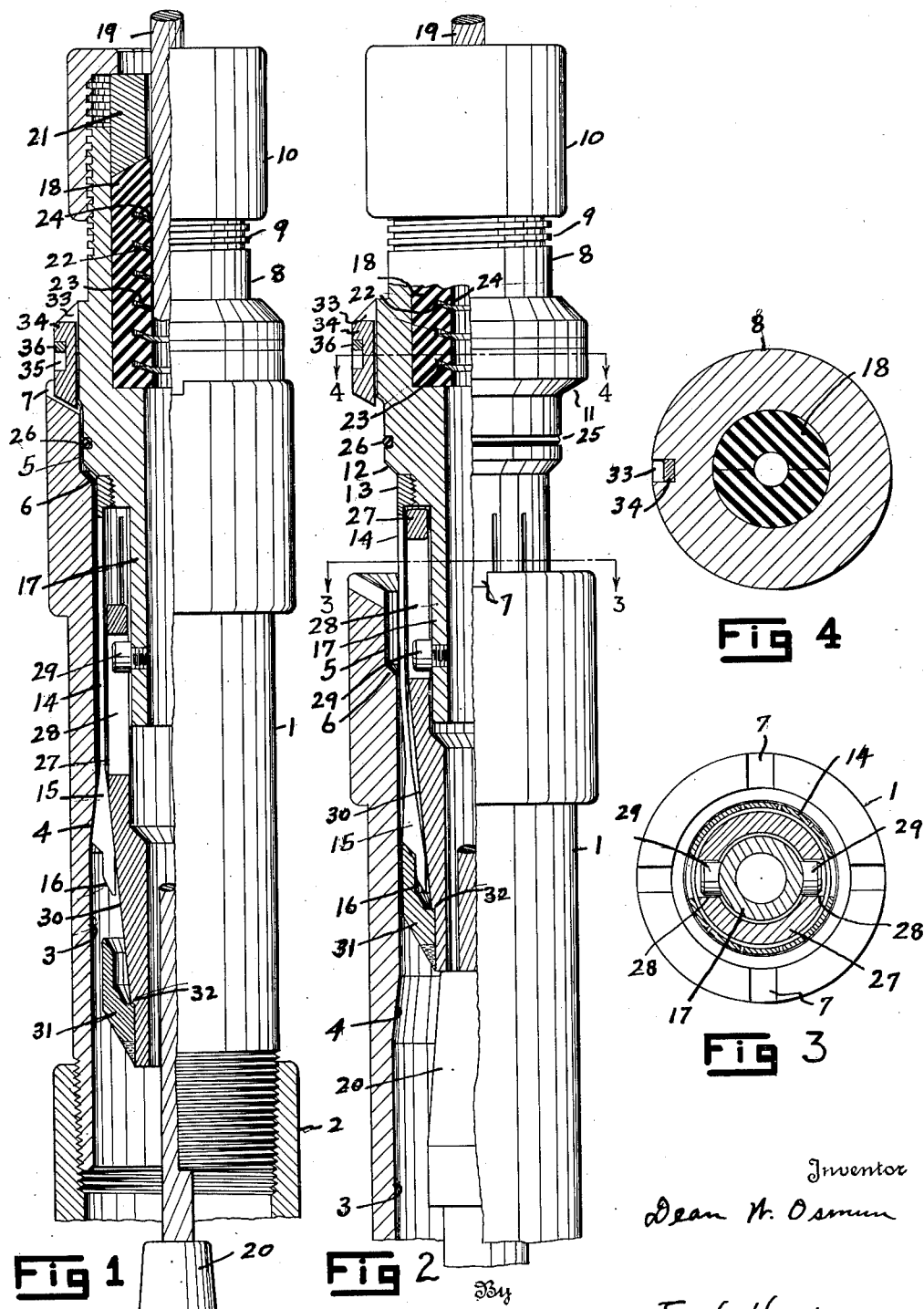

2,616,504

UNITED STATES PATENT OFFICE 2,616,504

SEALING MEANS

Dean W. Osmun, Houston, Tex.

Application March 6, 1947, Serial No. 732,909

5 Claims. (Cl. 166—14)

1

This invention relates to sealing means.

An object of the invention is to provide equipment including an outer housing for containing fluid under pressure and having an inner part movable in the housing and provided with a seal ring around the inner part forming a seal with the housing but which, at times, moves beyond the housing with a relief port in the housing so positioned that the pressure will be relieved before the seal ring is released by the housing; provision is thus made for relieving the seal ring from the high pressure before it emerges from the housing as otherwise the sudden escape of the pressure fluid might displace, distort or, in cases of very high pressure, destroy the seal ring.

Another object of the invention is to provide equipment of the character described wherein provision is made for, in times, latching the inner part and housing together against relative rotation.

The novel sealing arrangement and novel latch means have been illustrated and described in connection with a line wiper; however, they are capable of general use.

With the above and other objects in view the invention has particular relation to certain novel features of construction, operation and arrangement of parts, an example of which is given in this specification and illustrated in the accompanying drawings, wherein:

Figure 1 is a side view of a line wiper, partly in section, and connected to the upper end of a Christmas tree or other well connection, and embodying the invention.

Figure 2 is a fragmentary, side elevation, partly in section, showing the inner assembly elevated.

Figure 3 is a cross-sectional view taken on the line 3—3 of Figure 2, and

Figure 4 is a cross-sectional view taken on the line 4—4 of Figure 2.

Referring now more particularly to the drawings, wherein like numerals of reference designate the same parts in each of the figures, the numeral 1 designates the outer shell, or housing, which is tubular in form and which is adapted to be connected to the upper end of the Christmas tree 2 or other tubular connection.

Adjacent its lower end the housing 1 is enlarged internally, as at 3, and above said internally enlarged portion is slightly tapered upwardly forming the upwardly converging annular face 4. At its upper end the shell, or housing, 1 is enlarged externally and the upper end of this enlarged portion is enlarged internally, as at 5,

2 thus forming an annular upwardly facing shoulder 6 which is flared, or tapered, upwardly.

The upper end of the outer shell, or housing, 1 is slightly flared and is formed with a plurality of radiating slots 7.

The numeral 8 designates a tubular packing retainer which forms, also a slip support. This retainer is provided, at its upper end, with external coarse threads 9 designed to receive a clamp cap 10.

The packing retainer has an external downwardly tapering face 11 thereon and beneath said face also has an annular downwardly tapering face 12, said faces being provided to seat against the upwardly flared end of the outer shell, or housing, 1 and the upwardly flared shoulder 6, respectively, when the apparatus is assembled and in active position.

Screwed onto the packing retainer 8, beneath the downwardly tapering face 12 there is an anchor ring 13 and depending from this ring are the flexible arms 14 and on the lower ends of these arms are the upwardly tapering slip wedges 15. The lower ends of these wedges are inwardly reduced in thickness and terminate in downwardly tapering faces 16, as indicated in Figures 1 and 2.

There is a tubular inner mandrel 17 which depends from the packing retainer 8 and may be formed integrally therewith.

There is a sleeve-like packing 18 fitted within the retainer 8 shaped to fit closely around the operating cable 19. The lower end of this cable is attached to the conventional socket 20 from which the swab, or other apparatus to be operated in the well, depends.

A gland 21 is fitted within the upper end of the retainer 8 and its lower end bears against the upper end of the packing 18. The clamp cap 10 engages the gland 21 and the pressure of the gland against the packing 18 may be readily regulated by an appropriate manipulation of the clamp cap 10.

The packing 18 is preferably split longitudinally and thus formed into sections and the gland 21 is preferably similarly formed into sections for convenience in assembly.

The compression on the packing 18 should be so adjusted as to cause the packing to fit closely about the line 19 so as to prevent the escape of pressure fluid as well as to cause the packing to effectively wipe the line upon upward movement of the line through the packing.

This packing has inside annular slits 22 spaced apart from the upper to the lower ends thereof.

These slits decline inwardly thus forming declining annular lips 23 between them, the lower margins of the lips terminating in annular edges 24.

It will be obvious that upon downward movement of the line 19 the inner, or free, margins of the lips will recede slightly from the line so as not to unduly grip the same and the frictional wear on the lips will thus be relieved, but upon upward movement of the line through the packing the inner margins of the lips will be caused by friction to move upwardly and inwardly, thus very closely surrounding and gripping the line and effectively wiping the oil, slush and other material adhering to the line therefrom.

Between the shoulders 11 and 12 of the retainer 8 there is an external annular groove 25 in which an O-ring 26 is seated. When the inner assembly is in its lower position, as shown in Figure 1, this O-ring forms a seal between the retainer 8 and the opposing wall of the shell, or housing, 1 to effectively prevent the escape of fluid through the joint between said retainer and shell. It is, of course, obvious that any other suitable type of seal ring may be employed for this purpose.

Slidably fitted over the lower end of the inner mandrel 17 there is the outer mandrel 27. This outer mandrel has vertical slots 28 therein and screwed into the inner mandrel are set screws 29 whose heads project into the slots 28 and maintain the outer and inner mandrel assembled and prevent relative turning of the mandrels.

The outer mandrel 27 is downwardly tapered, externally, beneath said slots forming an expander 30 and secured onto its lower end is the ferrule 31 whose upper end is upwardly tapered and spaced from said expander. The ferrule abuts the external annular shoulder 32 on the expander 30 and is preferably welded to said expander.

Above the shoulder 11 the packing retainer is provided with a vertical slot 33 and slidable in this slot there is a latch 34. The outer side of this latch has a vertically elongated notch 35 and a cross-pin 36 has its ends anchored to the retainer 8 and extends through said notch to prevent displacement of the latch but to allow its vertical movement.

The lower end of the latch is downwardly and inwardly tapered and extends beneath the shoulder 11 when the latch is in its lower position.

In use the inner assembly comprising the packing retainer and the appendants thereof are assembled about the line 19 in the following manner:

The inner and outer mandrels 17 and 27, with the ferrule 31 attached to the latter, are assembled in, and secured to, said packing retainer and the line, without the socket 20 is passed downwardly through said assembly and the socket is then babbitted, or otherwise secured, to the line. The packing 18, gland 21 and the clamp cap 10, the latter having been previously threaded onto the line, are then inserted and secured in place. The swab or other apparatus to be lowered into the well is then connected to the socket 20 and is lowered into the well with the lower end of the inner assembly resting on said socket. It is to be understood that the housing 1 has been previously connected to the Christmas tree or to the other connection 2, all shown in Figure 1. When so assembled and lowered down into the well the ferrule 31 is engaged about the reduced lower ends of the slip wedges 15 whereby said wedges are held retracted. When the packing retainer 8 lands on the upper end of the housing 1 the outer mandrel 27 and ferrule 31 will move on down by gravity and the slip wedges 15 will be released by the ferrule and will spring outwardly. In this position the outer faces of the slip wedges will rest against the upwardly converging face, or seat, 4 of the housing 1 and the downwardly tapering portion, or expander, 30 of the outer mandrel 27 will wedge in between the slip wedges 15 fitting closely against the inside tapering faces of said wedges thus securely anchoring the wedges as well as the packing retainer in place, all as shown in Figure 1.

When the packing retainer 8 has been lowered, as above described, the lower end of the latch 34 will engage in one of the slots 7, or if it does not register with said notch the retainer may be turned to bring about such registration and the latch will then drop into said slot so that the retainer will thereafter be held against turning when it is desired to turn the clamp cap 10 to screw it up or unscrew it.

It is to be noted that when the seats 11 and 12 are seated on the upper end of the housing 1 and shoulder 6, respectively, the seal ring 26 will be beneath the slots 7.

The line operations may then be carried on without danger of leakage past either the seal ring or the packing 18 and upon upward movement of the line 19 it will be wiped clean.

When it is desired to withdraw the swab or other implement from the well it may be elevated to bring the socket 20 into contact with the lower end of the outer mandrel and further elevated to carry said outer mandrel upwardly; thereupon the expander portion of the outer mandrel will release the slip wedges, the outwardly flared ferrule will engage over the lower ends of the slip wedges and retract the wedges and the inner assembly of the wiper apparatus may then be carried on up with the line out of the housing 1.

However, as the inner assembly moves upwardly the seal ring 26 will clear the lower ends of the slots 7 before said seal ring emerges from the upper end of the housing 1 so that the pressure within the housing 1 may escape through said slots while the seal ring 26 is still retained in the groove 25 by the surrounding walls at the top of the housing 1. This will prevent the seal ring from being displaced by the inside pressure. Were it not for the release of this pressure through the slots 7 while the seal ring 26 is being so retained said seal ring would be displaced from its groove and possibly destroyed by the strong pressure escaping past it as it emerged from the housing.

In case the cable 19 should be rapidly elevated and the socket 20 carried into sudden impact against the lower end of the inner assembly said assembly will not be liable to be injured or the cable broken for the reason that the assembly will be released from the housing and carried upwardly as above explained.

Upon withdrawal of the swab or other tool from the well the housing 1 may be detached and the entire apparatus laid aside for further use.

The drawings and description disclose what is now considered to be a preferred form of the invention by way of illustration only, while the broad principle of the invention will be defined by the appended claims.

What I claim is:

1. A line wiper comprising, a tubular housing having a pressure relief channel opening at its inner end within the interior of the housing and opening at its outer end exteriorly of the housing, an inner assembly in the housing and movable upwardly relative thereto, a seal ring carried by the inner assembly and forming a seal between the assembly and housing beneath the inner end of said channel, said seal ring being movable upwardly with the inner assembly to a position within the housing above the inner end of said channel to open the channel to permit escape of pressure from within the housing.

2. A line wiper comprising, a tubular housing having a radial pressure relief channel opening at its inner end into the interior of the housing inwardly of the upper end of the housing and opening at its outer end exteriorly of the housing, an inner assembly in the housing and movable upwardly relative thereto, a seal ring carried by the inner assembly and forming a seal between the assembly and housing beneath the inner end of said channel, said seal ring being movable upwardly with the inner assembly to a position within the housing between the inner end of said channel and the upper end of the housing to open the channel to permit escape of pressure from within the housing.

3. A line wiper comprising, a tubular housing having a radial pressure relief channel opening at its inner end into the interior of the housing inwardly of the upper end of the housing and opening at its outer end exteriorly of the housing, an inner assembly in the housing and movable upwardly relative thereto, said inner assembly having an external annular groove, a seal ring around the inner assembly in the groove and forming a seal between the assembly and housing beneath the inner end of the channel, said seal ring being movable upwardly with the inner assembly to a position above the inner end of said channel to open the channel to permit escape of pressure from within the housing, said seal ring being maintained against displacement from said groove by the upper end of the housing while in said position.

4. A device of the character described comprising, a tubular housing having a pressure relief slot extending transversely through the housing, an inner tubular part in the housing movable longitudinally relative thereto, a seal ring around the inner part forming a seal between the inner part and housing and movable with the inner part to a position beyond the housing upon movement of the inner part in one longitudinal direction, said ring being movable with the inner part to a position to clear the bottom of the slot to permit escape of pressure from within the housing before the seal ring is removed from the housing upon movement of the inner part in said one direction, and a latch longitudinally movably mounted on the inner part, said slot also being open endwise of the housing to receive the latch to latch the inner part against rotation relative to the housing when the inner part is moved in the opposite longitudinal direction.

5 A line wiper comprising, a tubular housing having a pressure relief channel opening at its inner end within the interior of the housing and opening at its outer end exteriorly of the housing, an inner assembly in the housing and movable upwardly relative thereto, a seal ring carried by the inner assembly and forming a seal between said assembly and housing beneath the inner end of said channel, said seal ring being movable upwardly with the inner assembly to a position within the housing above the inner end of said channel to open the channel to permit escape of pressure from within the housing, the upper end of said channel forming an upwardly opening notch in the housing, and a latch mounted for longitudinal movement on said assembly into and out of latching engagement with the housing, said latch having an end portion adapted to project into said notch to latch said assembly against rotation relative to the housing.

DEAN W. OSMUN.

REFERENCES CITED

The following references are of record in the file of this patent:

UNITED STATES PATENTS

| Number | Name | Date |
| --- | --- | --- |
| 1,152,548 | Rigby | Sept. 7, 1915 |
| 1,737,196 | Mortenson et al. | Nov. 26, 1929 |
| 2,097,016 | Bowen | Oct. 26, 1937 |
| 2,440,015 | Meddick | Apr. 20, 1948 |
| 2,481,482 | Green | Sept. 13, 1949 |